(12) United States Patent
Pennybacker (10) Patent No.: US 10,231,372 B2
(45) Date of Patent: Mar. 19, 2019

(54) COUPLING DEVICE TO CONNECT TWO TRACTOR-PULLED AGRICULTURAL IMPLEMENTS FOR TANDEM-POWERED OPERATION

(71) Applicant: Matthew S. Pennybacker, Franklin, WV (US)

(72) Inventor: Matthew S. Pennybacker, Franklin, WV (US)

( * ) Notice: Subject to any disclaimer, the term of this patent is extended or adjusted under 35 U.S.C. 154(b) by 199 days.

(21) Appl. No.: 15/442,049

(22) Filed: Feb. 24, 2017

(65) Prior Publication Data
US 2018/0242509 A1   Aug. 30, 2018

(51) Int. Cl.
| A01B 59/04 | (2006.01) |
| B60D 1/07 | (2006.01) |
| B60D 1/48 | (2006.01) |
| B60D 1/167 | (2006.01) |
| A01B 59/042 | (2006.01) |
| A01D 43/04 | (2006.01) |

(52) U.S. Cl.
CPC ............ *A01B 59/04* (2013.01); *A01B 59/042* (2013.01); *A01D 43/04* (2013.01); *B60D 1/07* (2013.01); *B60D 1/167* (2013.01); *B60D 1/486* (2013.01)

(58) Field of Classification Search
CPC ... A01B 59/04; A01B 59/041; A01B 59/0415; A01B 59/042; A01B 59/044; A01B 59/046; B60K 17/28; B60D 2001/008; B60D 1/07; B60D 1/167; B60D 1/486
See application file for complete search history.

(56) References Cited

U.S. PATENT DOCUMENTS

| 1,375,577 | A | * | 4/1921 | Dunlap | A01B 59/042 172/327 |
| 2,187,411 | A | * | 1/1940 | Bechman | B60D 1/143 280/490.1 |
| 2,796,818 | A | * | 6/1957 | Tanke | A01B 59/041 172/275 |
| 2,800,341 | A | * | 7/1957 | Gaines, Jr. | A01B 59/042 280/406.1 |
| 2,934,357 | A | * | 4/1960 | Gewecke | A01D 45/028 172/439 |
| 3,140,103 | A | * | 7/1964 | Richardson | A01B 59/041 172/448 |
| 3,197,238 | A | * | 7/1965 | Goddard | B60D 1/167 280/494 |

(Continued)

FOREIGN PATENT DOCUMENTS

| DE | 1267104 B * | 4/1968 | ............ B60D 1/167 |
| DE | 4336492 A1 * | 6/1994 | ........... A01B 59/044 |
| EP | 0259801 B1 * | 1/1991 | ........... A01B 59/042 |

*Primary Examiner* — Joseph M Rocca
*Assistant Examiner* — Maurice L Williams
(74) *Attorney, Agent, or Firm* — Daniel L. Fitch (57) ABSTRACT

A coupling device to connect and separate first and second agricultural implements for tandem towing behind a tractor and to provide hydraulic power to the second agricultural implement for its powered operation is disclosed. Such coupling device has a frame having a separation distance, first connection means for attaching the frame to the rear of a first agricultural implement, second connection means for attaching the frame to the front of a second agricultural implement, and a hydraulic pump system to power the second agricultural implement. A dolly wheel and spindle assembly may adjoin the frame.

19 Claims, 8 Drawing Sheets

(56) References Cited

U.S. PATENT DOCUMENTS

| | | | | |
|---|---|---|---|---|
| 3,583,728 A * | 6/1971 | Cornell | B60D 1/00 | |
| | | | 280/503 | |
| 3,612,185 A * | 10/1971 | Grauberger | A01B 59/042 | |
| | | | 111/164 | |
| 3,717,364 A * | 2/1973 | McClive | B60D 1/00 | |
| | | | 280/406.2 | |
| 3,814,464 A * | 6/1974 | Wardill | B60D 1/075 | |
| | | | 280/476.1 | |
| 3,998,471 A * | 12/1976 | Lutchemeier | B60D 1/167 | |
| | | | 280/492 | |
| 4,366,877 A * | 1/1983 | Vissers | A01D 34/866 | |
| | | | 172/125 | |
| 4,405,148 A * | 9/1983 | Dickerson | B60D 1/143 | |
| | | | 280/491.5 | |
| 4,793,430 A | 12/1988 | Stephenson et al. | | |
| 4,838,358 A * | 6/1989 | Freudendahl | A01B 59/04 | |
| | | | 172/125 | |
| 5,287,934 A * | 2/1994 | Porter | A01B 33/16 | |
| | | | 172/120 | |
| 5,462,131 A | 10/1995 | Eidam et al. | | |
| 5,501,482 A * | 3/1996 | McClive | B60D 1/00 | |
| | | | 280/460.1 | |
| 5,516,140 A * | 5/1996 | Hinte | B60D 1/02 | |
| | | | 280/491.1 | |
| 5,685,554 A * | 11/1997 | Poxleitner | B60D 1/167 | |
| | | | 280/491.2 | |
| 5,706,901 A * | 1/1998 | Walters | A01B 71/066 | |
| | | | 172/439 | |
| 5,709,274 A * | 1/1998 | Herbold | B60D 1/07 | |
| | | | 172/248 | |
| 5,816,339 A | 10/1998 | Parsons et al. | | |
| 6,273,447 B1 * | 8/2001 | Vande Berg | B60D 1/06 | |
| | | | 280/408 | |
| 7,204,318 B2 * | 4/2007 | Taylor | A01B 59/042 | |
| | | | 172/439 | |
| 7,353,885 B2 * | 4/2008 | Nordhoff | A01B 59/068 | |
| | | | 172/272 | |
| 8,096,571 B1 | 1/2012 | Noe | | |
| 8,555,994 B2 * | 10/2013 | Van Den Engel | A01D 78/1014 | |
| | | | 172/272 | |
| 9,066,471 B1 * | 6/2015 | Monahan | A01D 90/083 | |
| 2004/0212176 A1 * | 10/2004 | Colistro | B60D 1/075 | |
| | | | 280/482 | |
| 2015/0123378 A1 * | 5/2015 | Tortellier | B60P 1/02 | |
| | | | 280/456.1 | |
| 2017/0202128 A1 * | 7/2017 | Emmert | A01B 59/043 | |

\* cited by examiner

COUPLING DEVICE TO CONNECT TWO TRACTOR-PULLED AGRICULTURAL IMPLEMENTS FOR TANDEM-POWERED OPERATION

CROSS-REFERENCE TO RELATED PATENT APPLICATIONS

NONE

STATEMENT REGARDING FEDERALLY SPONSORED RESEARCH OR DEVELOPMENT

NONE

BACKGROUND OF INVENTION

Field of Invention

The present disclosure is directed towards a novel design for a coupling device designed to connect a first agricultural implement to a second agricultural implement and enable the tandem-powered operation of both agricultural implements when being towed by a farm tractor or similar machine. In current practice, a single agricultural implement is pulled behind a tractor during powered operation. An agricultural implement ordinarily is attached directly to the rear of the tractor and powered by the tractor's power take-off ("PTO") shaft. The present invention enables two agricultural implements to be connected to a tractor in tandem, one behind the other, while facilitating the powered operation of both.

The coupling device comprises a frame and connection means to attach it to the rear of the first agricultural implement and the front of the second agricultural implement. The frame separates the two implements by a separation distance so they may articulate smoothly about each other when being towed and turned in tandem. In one embodiment, as shown in the drawings, the frame may be generally bow-shaped or u-shaped. The frame members may be tubular/hollow and/or solid/non-hollow and may be fabricated from metal alloys, composites, or other materials of similar strength as is well known to those in the art. The frame may have a pair of curved frame members, having first and second ends, as depicted and described herein. As shown in the drawings, the frame may be widest where the first ends of the curved frame members connect to the first agricultural implement. The curved frame members may curve from their first ends and extend rearward to second ends which may connect to a plurality of box frame members as depicted and described herein.

The coupling device has first connection means to attach the front of the frame to the rear of the first agricultural implement. In one embodiment, as shown in the drawings, a pair of clevis fastener and spindle assemblies may be fitted to the outer rear wheels of the first agricultural implement providing first connection means to attach the rear of the first agricultural implement to the first ends of the curved frame members. The frame of the coupling device may also be attached to the rear of the first agricultural implement with other suitable first connection means as a person skilled in the art would know.

The coupling device has second connection means to attach the rear of the frame to the second agricultural implement. In one embodiment, as shown in the drawings, a draw bar may extend from the rear of the frame and a hitch pin may be used to fasten the draw bar to the tongue/tow bar of the second agricultural implement. The coupling device may also be attached to the second agricultural implement with other suitable second connection means as a person skilled in the art would know.

There may be a dolly wheel and spindle assembly, supported by and/or adjacent to the frame, to add stability to the coupling device and to keep it from dragging along the ground during use. In one embodiment, as shown in the drawings, the dolly wheel and spindle assembly may swivel 360 degrees beneath the frame to facilitate smooth turning of the coupling device and fluid articulation of the agricultural implements about one another when they are coupled together and being towed in powered operation.

The coupling device further comprises a hydraulic pump system used to power the second agricultural implement once it is coupled to the frame. The hydraulic pump system may include a hydraulic pump having a PTO shaft and a pair of extended hydraulic hoses having connection couplers. The hydraulic pump system may have fastening means for securing the hydraulic pump to the front of the second agricultural implement (e.g. on its tongue or tow bar), such as a pump frame used to seat and anchor the hydraulic pump firmly in a position while it powers the second agricultural implement. In other embodiments, the hydraulic pump may have fastening means for securing the hydraulic pump to the frame (e.g. on or adjacent to a frame member near the rear of the frame), such as a pump frame used to seat and anchor the hydraulic pump firmly in position while it powers the second agricultural implement. The pump frame may be fastened to the second agricultural implement or frame member by any number of means well known to one of skill in the art (e.g. bolts and nuts, screws, etc.). The pair of extended hydraulic hoses may connect to the ports of the tractor's hydraulic power block, extend across the first agricultural implement and coupling device, and further connect to the ports of the hydraulic pump.

Background of the Invention and Related Art

It is well known to pull a single agricultural implement behind a tractor for powered operation. Usually, this is accomplished by attaching the agricultural implement, such as a hay mower, to a three point hitch of a tractor. The implement is typically connected to the PTO shaft of the tractor to power its operation. The attachment between the tractor and the implement is direct, as is the transmission of mechanical power to the agricultural implement from the tractor's PTO shaft. In a two-step process, such as mowing and tedding hay, the operator first attaches the mower to the tractor's hitch and PTO shaft before commencing mowing operations. The tractor operator ordinarily traverses an entire field, pulling the first agricultural implement and completing the first powered operation, in this example, mowing. Thereafter, the operator ordinarily disconnects the first agricultural implement from the tractor, attaches the second agricultural implement, and traverses the same field a second time—pulling the second agricultural implement across the same ground to complete the second powered operation, in this example, tedding. This two-step process is inefficient in any number of ways. For example, the tractor operator must make two passes over the same field to accomplish two separate and serial tasks, here mowing and tedding hay, rather than accomplishing both tasks in a single pass. In so doing, the operator expends approximately twice the amount of time traversing the same field thereby using approximately twice as much fuel to operate the tractor and approximately doubling the tractor's operating hours.

What is needed is a device to couple the first agricultural implement to the second agricultural implement while powering the second agricultural implement such that both implements may perform their powered functions in tandem while being towed behind a tractor.

The prior art includes a tractor hitch assembly comprised of a draw bar with a hydraulic pump. U.S. Pat. No. 8,096,571 ('571 Patent). The device of the '571 Patent includes a set of trailer tongue couplers to attach the device to both the tractor and an agricultural implement. Unlike the present invention, the device does not teach the tandem-powered operation of two separate implements. Rather, it teaches a reduced weight tractor hitch assembly that sufficiently supports a hydraulic pump.

The prior art also includes a hitch that attaches to the front end of a device that, in turn, attaches to the back of a tractor. U.S. Pat. No. 5,816,339 ('339 Patent). The purpose of the invention of the '339 Patent is to improve the swivel hitch structure to be used with a quick hitch coupler. The arms of the device of the '339 Patent attach to a central cross member which includes a receiving receptacle to attach to the rear of the tractor. The device of the '339 Patent does not teach the tandem-powered operation of the two separate agricultural implements, nor provide a means for attaching them to the rear of a tractor.

The prior art also includes a hitch and drive assembly for PTO-driven implements. U.S. Pat. No. 4,793,430 ('430 Patent). The device of the '430 Patent includes a transmission housing mounted for rotation about an upright axis that passes through a ball connection between a draw bar of the hitch adapter and the tongue of the implement. The tractor's PTO shaft is connected by a telescopic drive shaft to an input shaft supported by the transmission housing for rotation about an axis extending perpendicular to and intersecting said upright axis. The purpose of the invention is to allow the hitch adapter to roll in relation to the housing about a second axis so that sharp turns can be made without damaging driven components of an implement or the drive for such components. The device of the '430 Patent does not teach the tandem-powered operation of separate agricultural implements, nor provide a means for attaching two implements to the rear of a tractor.

The prior art also includes a device for attaching an agricultural implement to a tractor. U.S. Pat. No. 5,462,131 ('131 Patent). The invention of the '131 Patent teaches a device which attaches to an agricultural implement and a tractor and establishes a drive connection between the PTO shaft of the tractor and the drive of the implement using two bevel gear angle drives. This system allows the tractor and implement to pivot relative to one another around three axes. The device of the '131 Patent does not teach the tandem-powered operation of two separate agricultural implements, nor does it provide a means for attaching them to the rear of a tractor.

What is needed is a coupling device that can be used to connect two agricultural implements, one behind the other, which further provides power to the second agricultural implement thereby allowing the tandem-powered operation of both implements while being towed behind a tractor. The frame of such coupling device provides a separation distance between the two implements to facilitate smooth articulation and turning during powered operation. Such separation distance also allows for the completion of the first operation (e.g. laying down mowed hay behind the mower) before the commencement of the second operation (e.g. tedding of the mowed hay). A coupling device is needed that has connection means to allow for the ease of connecting both agricultural implements to a frame having a separation distance. More specifically, what is needed is a coupling device which attaches to the rear of the first agricultural implement and the front of the second agricultural implement while enabling the powered operation of the second agricultural implement in tow behind a tractor. The first agricultural implement may thus be powered by the tractor's PTO shaft or by the mechanical turning of the tractor's wheels while the second agricultural implement is powered by the coupling device's hydraulic pump system.

The present invention accomplishes these objectives.

SUMMARY OF INVENTION

The present invention is a novel design for a coupling device to connect two agricultural implements, one behind the other, for tandem-powered operation while both are being towed behind by a tractor, or other machine capable of pulling two or more implements and providing hydraulic power. In order to overcome the disadvantages of the prior art, a coupling device is disclosed that includes a frame having a separation distance, connection means for attaching the frame to both agricultural implements, and a hydraulic pump system for powering the second agricultural implement. In one embodiment, the frame may be comprised of a plurality of frame members, including a pair of curved frame members having first and second ends. The first ends of the curved frame members may form the frame's greatest width, narrowing towards their second ends. This curvature may give the frame a bow-shaped or u-shaped configuration. The second ends of the curved frame members may connect to a plurality of box frame members that form the remainder of the frame. Both tubular/hollow and/or solid/non-hollow frame members may be utilized in fashioning the frame.

Figure 8:
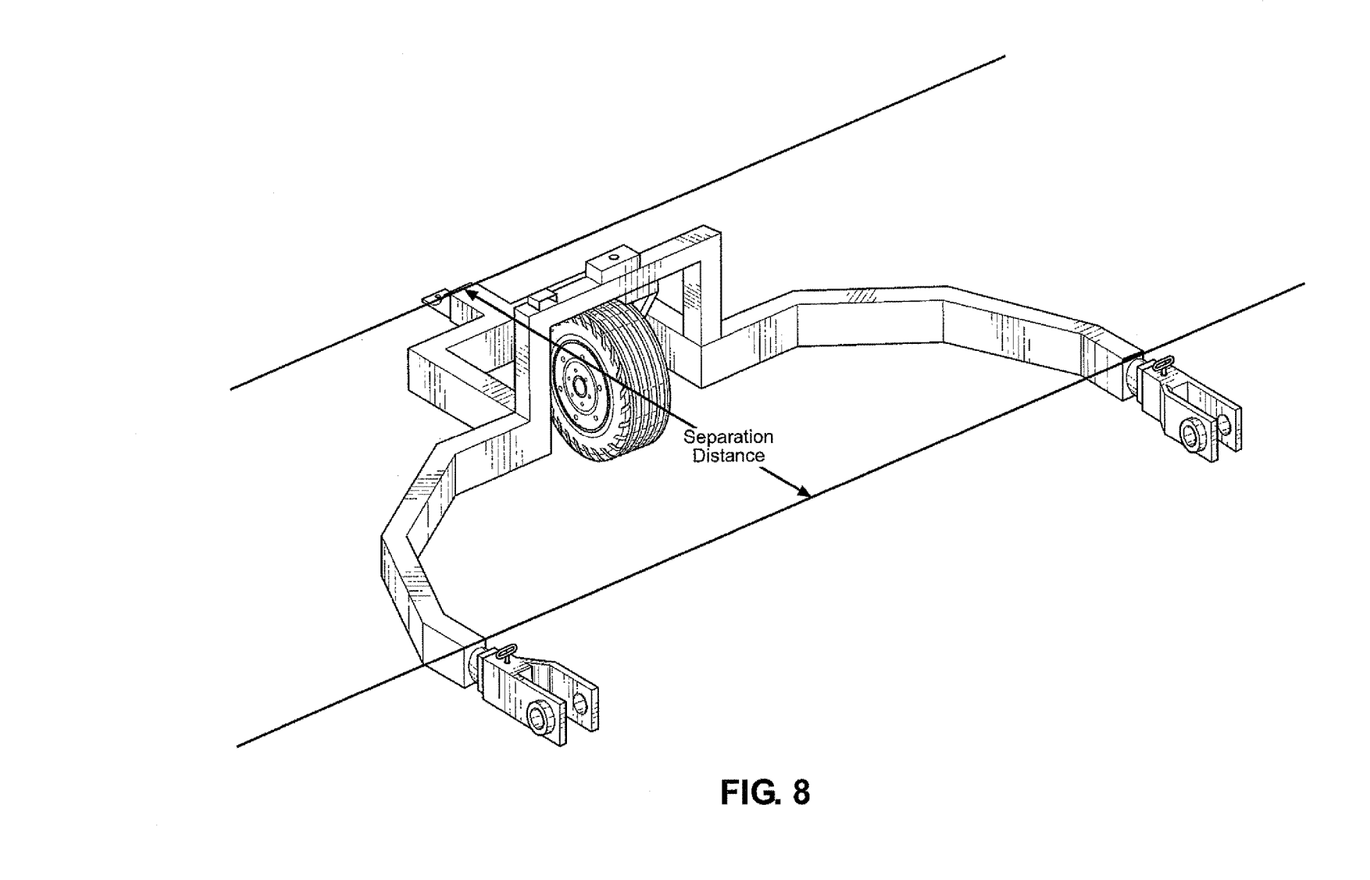
FIG. 8 is a front perspective view of the frame of the coupling device, showing the separation distance.

The separation distance is the length of the frame between the frame's points of attachment to the first connection means and the second connection means. More specifically, the separation distance is the length of the frame between its points of attachment to the first and second connection means, measured from front to back along the frame's centerline. A visual depiction of the separation distance is shown in FIG. 8. The separation distance facilitates a spacing between the two agricultural implements thereby allowing the completion of the first powered operation by the first agricultural implement before the commencement of the second agricultural powered operation by the second implement. The separation distance also facilitates the smooth turning of each agricultural implement about the other. While there is no prescribed separation distance, it is a function of both the time needed to complete the first powered operation at normal operating speeds and of the desired turning radius of the two implements when they are being towed in tandem. In the embodiment shown in the drawings (e.g. FIG. 8), the frame's separation distance is approximately 60 inches. Nevertheless, the separation distance may be shorter or longer as a function of the foregoing considerations as will be well understood to one of the skill in the art.

Other frame shapes and configurations may be fashioned with a plurality of frame members or with a single piece frame member, to separate the two agricultural implements. Such frame member(s) may be tubular/hollow and/or solid/non-hollow. By way of providing a non-limiting example of such other frame configurations, a frame may be comprised of a single piece frame member having a bow-like shape and similar connection means to both the first agricultural implement and second agricultural implement as described herein.

In still other non-limiting examples, the frame may comprise a plurality of frame members or a single piece frame member having a plurality of shapes and separation distances (e.g. a frame that when viewed from above is shaped like a bow, triangle, a circle, an oval, a parabola, a rectangle, or a square between its first and second connection means). Additional frame member configurations (e.g. frame members such as the box frame members disclosed herein, platforms to attach a pump frame or a dolly wheel and spindle assembly) may be adjoined to any frame configuration to add additional complexity and dimension to the frame.

As shown in the embodiment depicted in the drawings, the first ends of the curved frame members may be attached and secured to the outer rear wheels of the first agricultural implement utilizing first connection means that include a pair of clevis fastener and spindle assemblies and hitch pins. In other embodiments of the first connection means, the first ends of the curved frame members may be attached to the first agricultural implement using other suitable connection means known to those of ordinary skill in the art. In still other embodiments of the first connection means, the frame may be attached to the rear of the first agricultural implement at one or more points of attachment (e.g. a draw bar/tongue/hitch pin assembly at a single point, tow hook/ tow eye assembly, draw bar/tow bar assembly, pintle hook/ towing assembly, hitch ball/coupler assembly centered behind the first agricultural implement) and extend rearward by a separation distance to the second connection means.

As shown in the embodiment depicted in the drawings, a draw bar may extend behind the frame to provide second connection means to the front of the second agricultural implement when it is attached to the second agricultural implement's tow bar or tongue with a hitch pin. Other second connection means for attaching the rear of the coupling device to the front of the second agricultural implement may be utilized as will be known to one of ordinary skill in the art (e.g. draw bar/tongue/hitch pin assembly, tow hook/tow eye assembly, draw bar/tow bar assembly, pintle hook/towing assembly, hitch ball/coupler assembly).

As shown in the embodiment depicted in the drawings, there may be at least one dolly wheel and spindle assembly supported to and/or adjacent to the frame to add stability, enhance articulation of the coupling device during powered operation and keep the coupling device from dragging along the ground.

In addition, the coupling device comprises a hydraulic pump assembly to provide power to the second agricultural implement. As shown in the embodiment depicted in the drawings, the hydraulic pump assembly may further comprise a hydraulic pump having a PTO shaft, fastening means for securing or anchoring the hydraulic pump to the front of the second agricultural implement (e.g. secured to the second agricultural implement's tongue or tow bar) such as a pump frame, and extended hydraulic hoses with first and second ends having connection couplers (e.g. hydraulic quick connectors) for connection to the tractor's hydraulic ports and the ports of the hydraulic pump. Fastening means such as a pump frame may also secure the hydraulic pump to a frame member.

The present invention thereby provides a stable and supportive frame having a separation distance between the two agricultural implements, connection means to both agricultural implements and a hydraulic pump assembly to power the second agricultural implement. The separation distance is long enough such that both agricultural implements are able to articulate freely about one another without interference when being towed and turned in powered operation. As previously noted, this separation distance is also of sufficient length such that there is time for the completion of the first agricultural implement's powered operation at normal operating speeds before the commencement of the second agricultural implement's powered operation. The first agricultural implement is attached directly to the rear of a tractor and powered by its PTO shaft or by the mechanical turning of the tractor's wheels. The coupling device is attached to the rear of the first agricultural implement by first connection means. The second agricultural implement is attached to the rear of the coupling device by second connection means. The hydraulic pump, once fastened either to the front of the second agricultural implement or to a frame member and connected by extended hydraulic hoses to the tractor's hydraulic power block, powers the second agricultural implement enabling it to perform its powered function in series with the first agricultural implement. The effect is to save operator time, tractor wear and tear, and fuel which would otherwise be expended operating each agricultural implement in a two-stage process.

From the following detailed description taken in conjunction with the accompanying drawings and subjoined claims, other objects and advantages of the present invention will become apparent to those skilled in the art.

DETAILED DESCRIPTION OF THE INVENTION AND PREFERRED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, as well as applications of the principles of the invention as illustrated therein, being contemplated as would normally occur to one skilled in the art to which the invention relates.

With reference now to the drawings, FIGS. 1-8 depict a novel design for a coupling device [100] in accordance with the present invention. References to "first," "second,"

Figure 1:
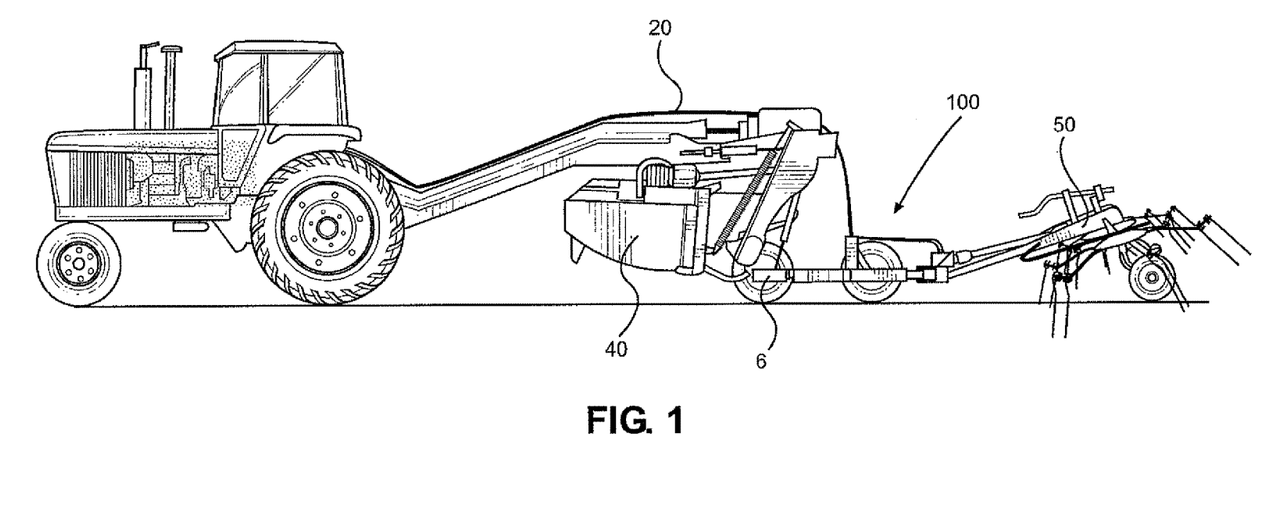
FIG. 1. is a side view of a tractor, a first agricultural implement, the coupling device, and a second agricultural implement.
Figure 2:
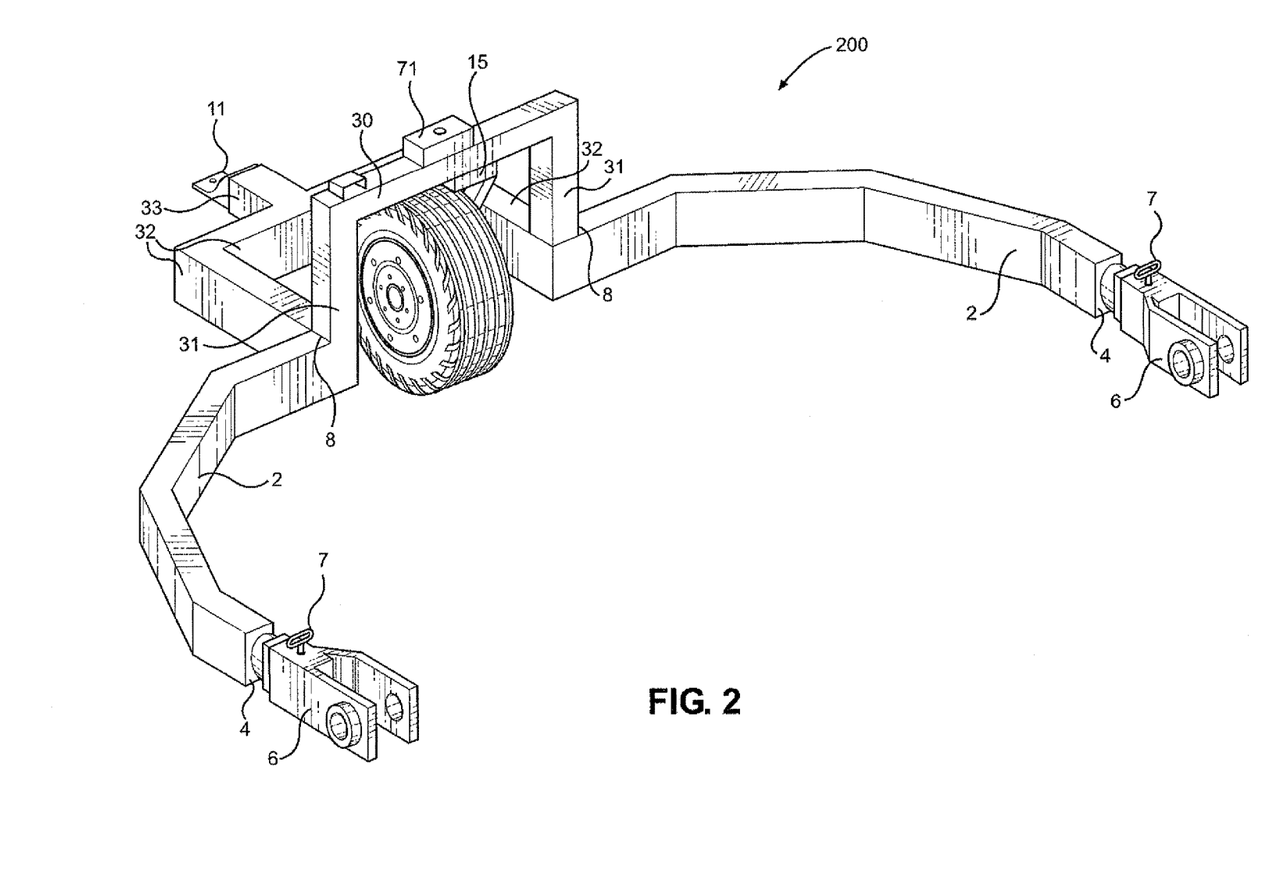
FIG. 2 is a front perspective view of the frame of the coupling device, as well as depicting the clevis fastener and spindle assembly.
Figure 3:
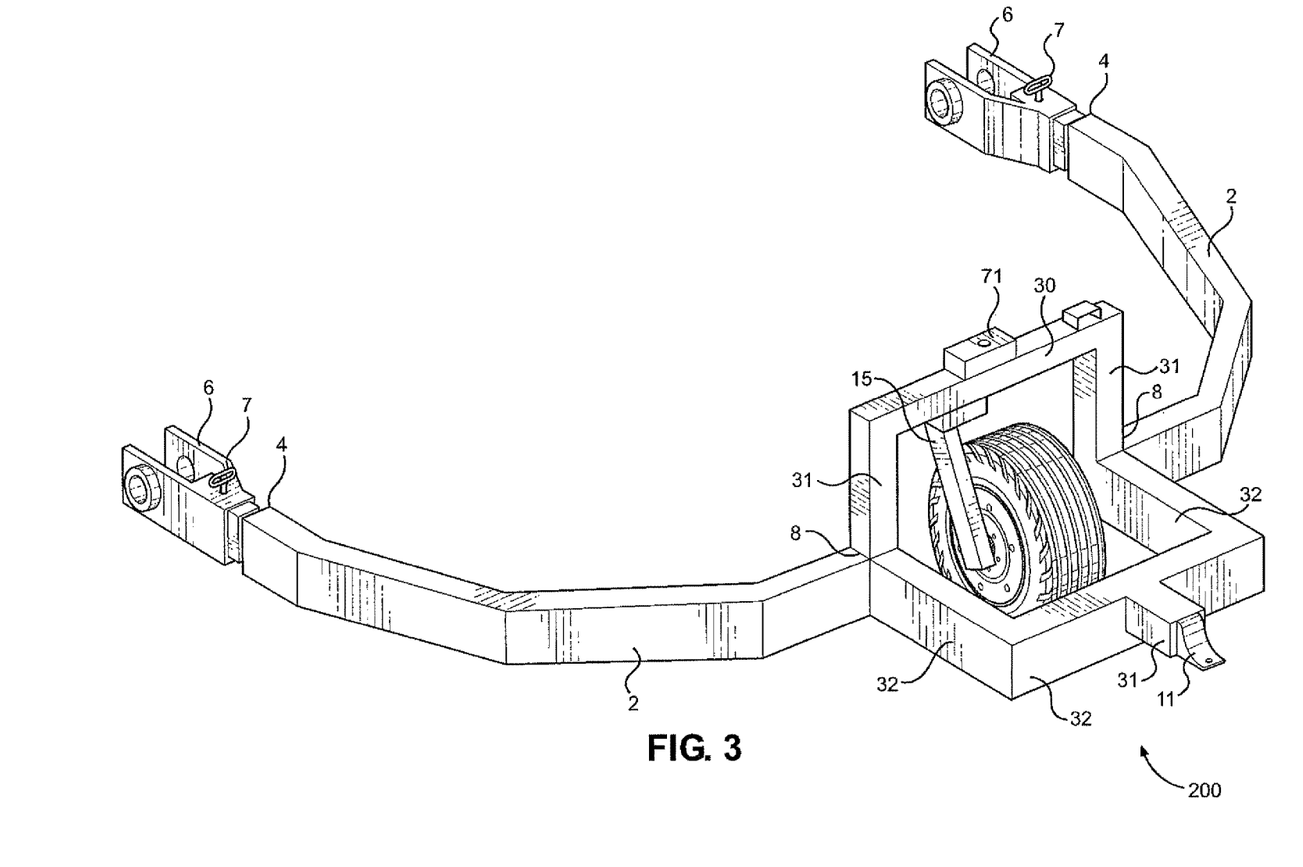
FIG. 3 is a rear perspective view of the frame of the coupling device, also depicting the clevis fastener and spindle assembly.

"front," "forward" and "rear" or "rearward" herein derive their meaning from an orientation in which the tractor is positioned at the front as shown in FIG. 1, followed next by a first agricultural implement [40], followed next by the coupling device [100], and followed next by a second agricultural implement [50], which occupies the rear. The coupling device [100] has a frame [200] which may be comprised of two curved frame members [2] and a plurality of box frame members [30, 31, 32, and 33]. The coupling device has first connection means [6, 7, 73] and second connection means [11, 13, 72] for attaching the frame to the first and second agricultural implements, respectively. The frame [200] may be comprised of frame members [2, 30, 31, 32, 33] that are tubular/hollow and/or solid/non-hollow and fabricated from metal alloys, composites or other materials having similar strength as is well known to those in the art. As shown in FIGS. 2 and 3, the frame [200] may have a bow-like shape which curves from first ends [4] of the curved frame members [2] rearward from its greatest width, where it attaches to the first agricultural implement [40], to its narrowest width, where it attaches to the second agricultural implement [50]. As shown on FIGS. 2 and 3, curved frame members [2] may arc in a bow-shaped fashion towards the rear of the coupling device towards second ends [8] which may, in turn, connect to a plurality of box frame members [30, 31, 32, and 33]. The box frame members may include an upper box member [30], vertical box members [31], horizontal box members [32] and a rear box member [33]. Any number of other frame shapes and configurations may be fashioned with a plurality of frame members, or using a single frame member, to effect the separation of the two agricultural implements. For example, the frame may comprise a plurality of frame members or a single piece frame member having a plurality of shapes and configurations creating a separation distance (e.g. a frame shaped like a bow, a triangle, a circle, an oval, a rectangle, a parabola or a square between its first and second connection means). By way of another non-limiting example, a bow-shaped frame may be fashioned of a single frame member having two first ends [4] defining its greatest width and curving rearward. Additional frame members (e.g. frame members such as the box frame members disclosed herein, platforms to attach a pump frame [18] or a dolly wheel and spindle assembly [15]) may be adjoined to any frame configuration to add additional complexity and dimension to the frame.

Figure 4:
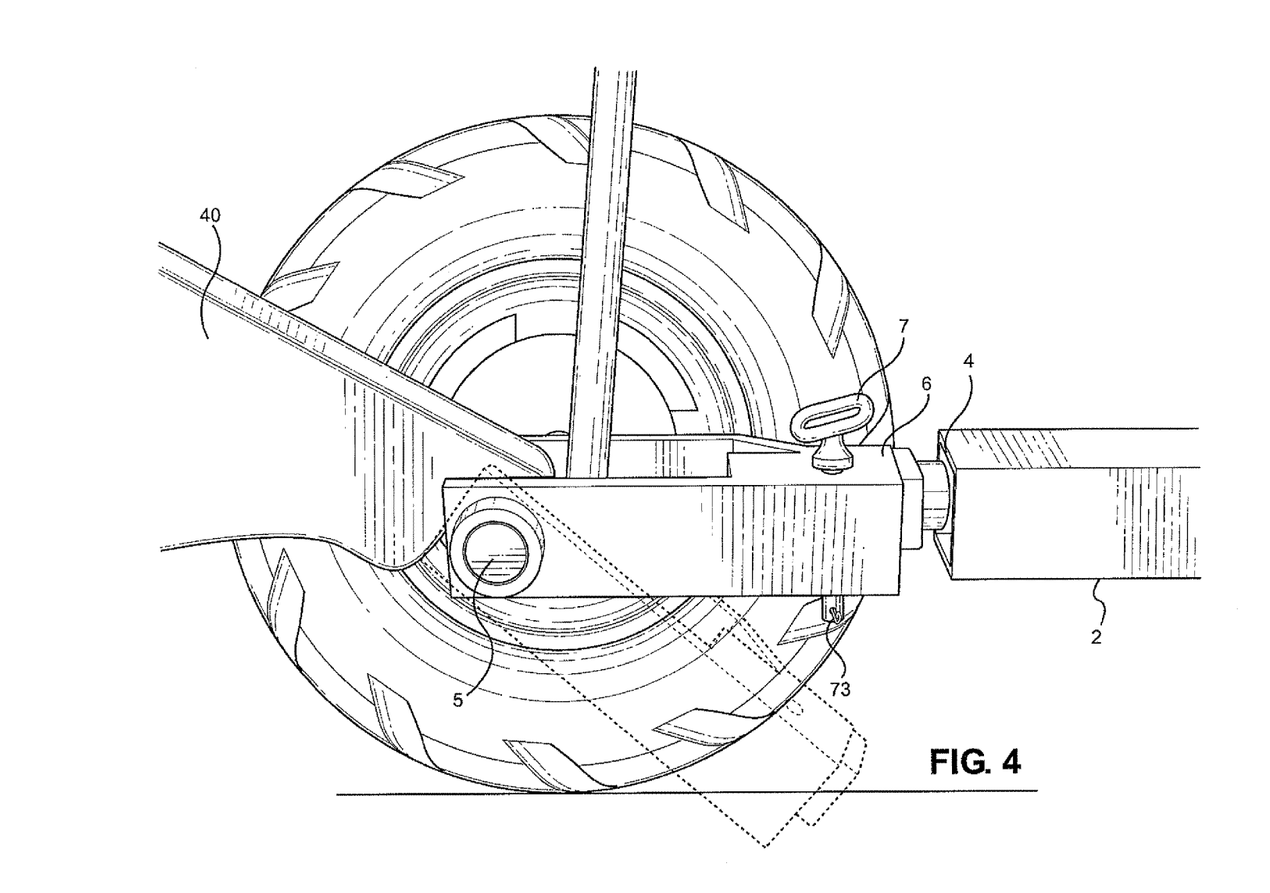
FIG. 4 is a side view of the clevis fastener and spindle assembly mounted to the outside rear wheel of the first agricultural implement.

First connection means [6, 7, 73] are provided to attach the frame [200] to the rear of the first agricultural implement [40]. As shown in FIG. 4, the first ends [4] of the curved frame members [2] may be attached to the outside wheels of the first agricultural implement [40] using a pair of clevis fastener and spindle assemblies [6] to provide first connection means. As shown further in FIG. 4, a pair of clevis fastener and spindle assemblies [6] may be permanently attached to the outside rear wheel of the first agricultural implement [40], such as a mower, to allow for the quick hitching and unhitching of the connecting device to the rear of the first agricultural implement [40]. As shown further in FIGS. 4 and 7, to effect a permanent attachment of the clevis fastener and spindle assemblies to the outer rear wheels, a spindle pin [5] having a longer length than the factory-installed spindle pin may replace the factory-installed spindle pin for purposes of completing each clevis fastener and spindle assembly [6]. The pair of clevis fastener and spindle assemblies [6], so attached, may be made a permanent part of the outer rear wheels of the first agricultural implement in order to facilitate ease of attaching it to the front of the coupling device [100]. As shown in FIGS. 2, 3, and 4, hitch pins [7] may be used to secure the first ends [4] of the curved frame members [2] to the pair of clevis fastener and spindle assemblies [6] of the first agricultural implement [40]. As shown in FIG. 4, a hitch pin clip [73] may be used to further secure the hitch pin [7]. Other first connection means for attaching the front of the coupling device [100] to the rear of the first agricultural implement [40] may be utilized as will be well known to one of ordinary skill in the art. As a non-limiting example, the frame may be attached to the rear of the first agricultural implement at one or more point(s) of attachment (e.g. a draw bar/tongue/hitch pin assembly at a single point, tow hook/tow eye assembly, draw bar/tow bar assembly, pintle hook/towing assembly, hitch ball/coupler assembly) and extend rearward to the second connection means.

Figure 5:
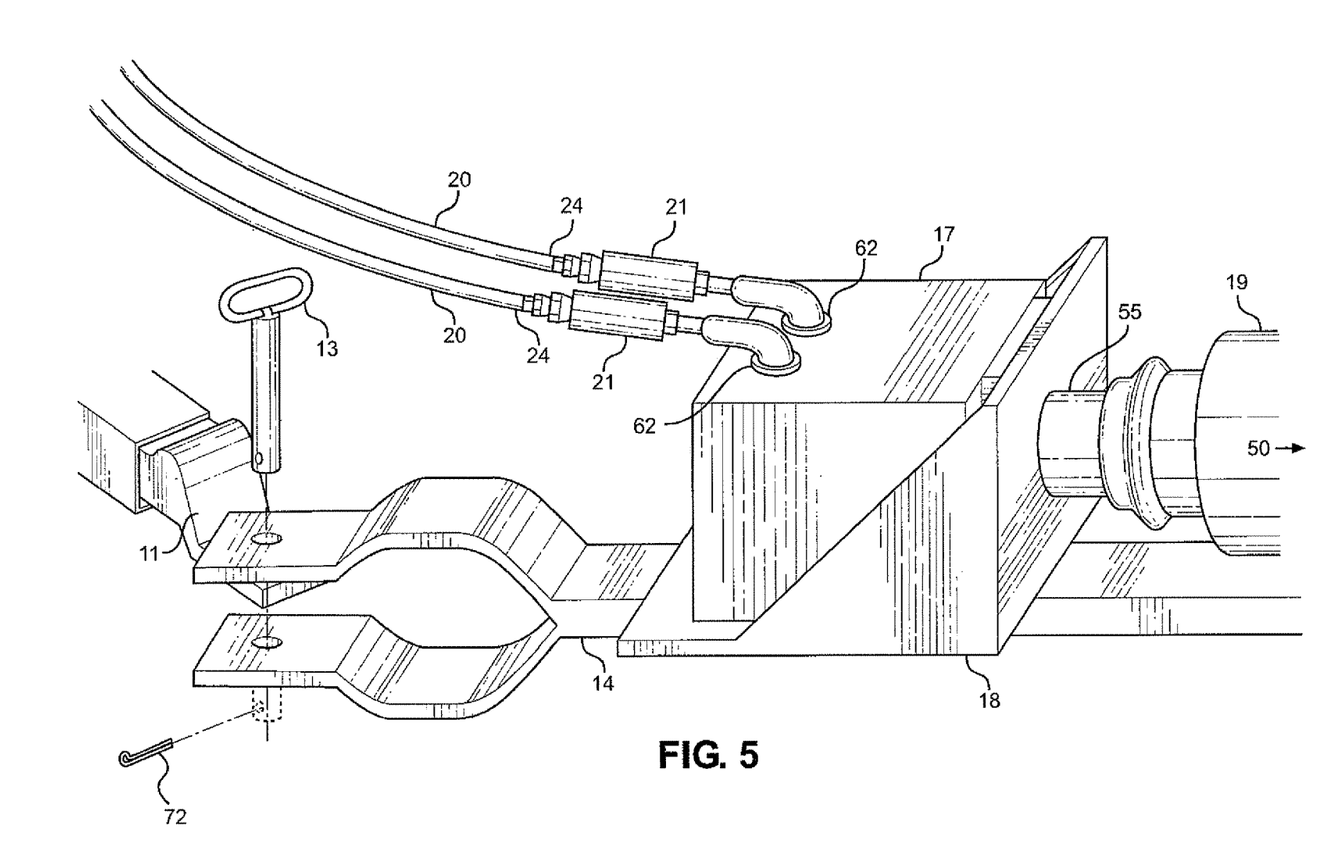
FIG. 5 is a side perspective view of the hydraulic pump assembly from the front of a second agricultural implement.

Second connection means are provided for attaching the rear of the frame to the front of the second agricultural implement. As shown in FIGS. 2, 3, and 5, the second connection means may include a draw bar [11] that extends from the rear box member [33] to provide second connection means to the second agricultural implement [50]. As shown in FIG. 5, a hitch pin [13] and hitch pin clip [72] may be used to secure the tongue [14] of the second agricultural implement [50] to the draw bar [11]. Other second connection means for attaching the rear of the coupling device [100] to the front of the second agricultural implement [50] may be utilized as will be well known to one of ordinary skill in the art (e.g. draw bar/tongue/hitch pin assembly, tow hook/tow eye assembly, draw bar/tow bar assembly, pintle hook/towing assembly, hitch ball/coupler assembly).

As shown on FIG. 8, the frame has a separation distance, the length of the frame between its points of attachment to the first and second connection means measured along the centerline of the frame from front to back.

As shown best in FIG. 3, at least one dolly wheel and spindle assembly [15] may be supported to and/or adjacent to the upper box member [30] as shown, to add stability and enable the coupling device [100] to roll along the ground and prevent it from dragging during operation. The dolly wheel and spindle assembly [15] may be supported to and/or adjacent other members of the frame for the same purposes as will be known to one of ordinary skill in the art. The dolly wheel and spindle assembly [15] may swivel up to 360 degrees beneath the frame to allow for smooth turning of the coupling device while being towed. As shown on FIG. 3, the dolly wheel and spindle assembly [15] may be supported to and adjacent to the upper member [30] using a pivoting spindle and pin assembly [71] or other fastening means as will be well known to one skilled in the art. In other embodiments, more than one dolly and spindle assembly [15] may be supported to and/or adjacent the frame to enable smooth turning of the coupling device when being pulled and to facilitate fluid articulation of the agricultural implements about one another.

Figure 6:
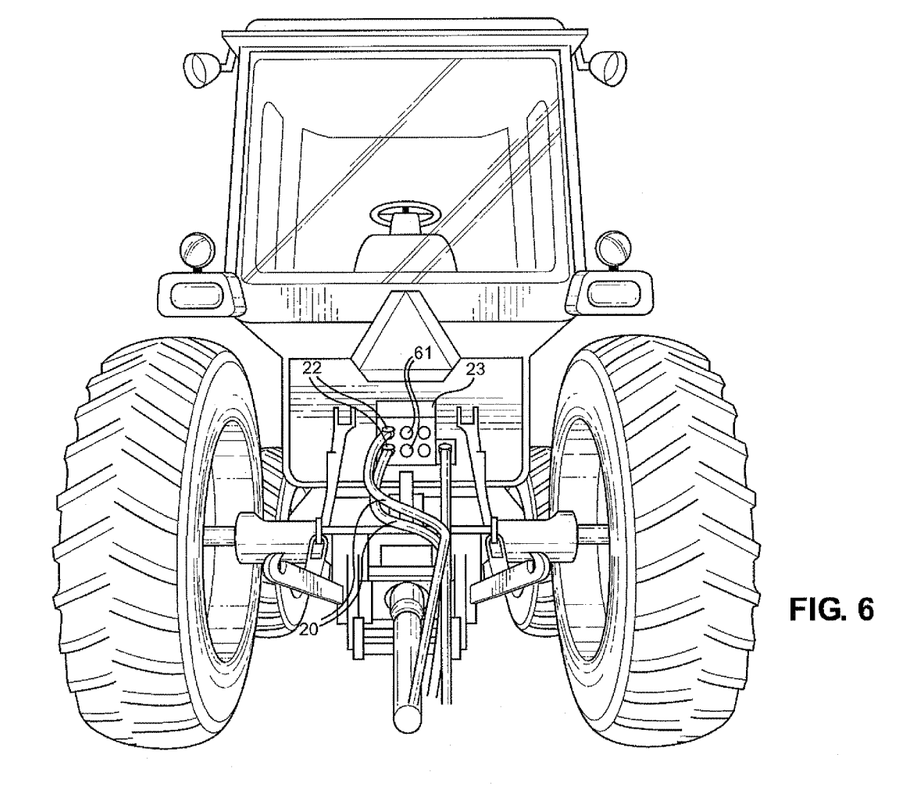
FIG. 6 is a rear view of the connecting hydraulic ports of a tractor and hydraulic hoses.
Figure 7:
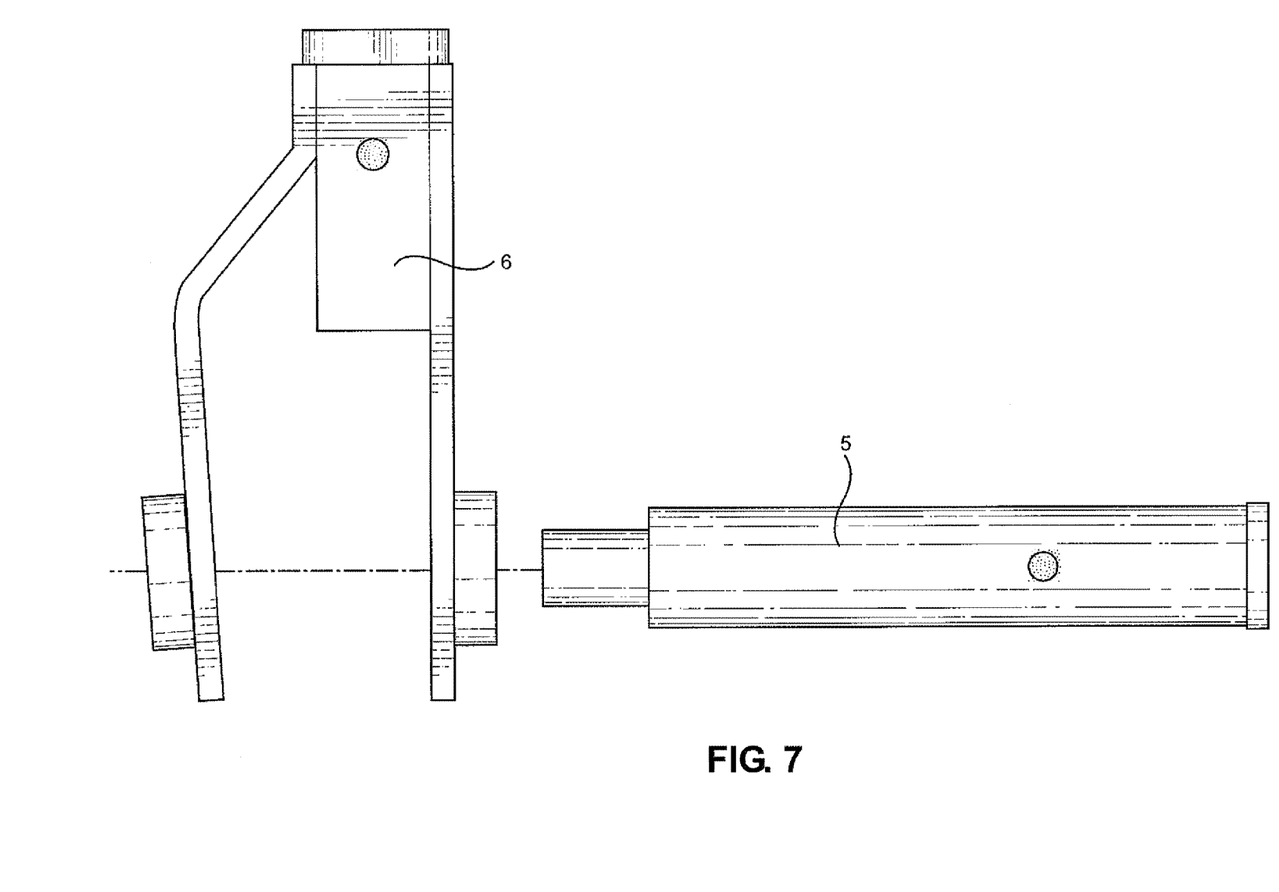
FIG. 7 is a top view of the clevis fastener and spindle assembly.

As shown in FIGS. 5 and 6, a hydraulic pump system is provided comprising a hydraulic pump [17] having a PTO shaft [55] and a pair of hydraulic hoses [20] having connection means at both ends [22, 24]. Different hydraulic designs, systems, or variations may be used as one of ordinary skill in the art would know. As shown in FIG. 5, the hydraulic pump system may have fastening means for securing the hydraulic pump [17] to the front of the second agricultural implement [50] to secure and anchor the hydraulic pump [17]. In the embodiment shown, a pump frame [18] is mounted to the tongue or draw bar [14] of the second agricultural implement [50]. In other embodiments, the hydraulic pump may be secured to the front of the second agricultural implement [50] using other fastening means as will be well known to one of ordinary skill in the art (e.g. bolts and nuts, screws, etc.). In still other embodiments, the hydraulic pump [17] may be secured to the frame using similar fastening means. The hydraulic pump [17] may have a PTO shaft [55] as shown for connection to the drive shaft [19] of the second agricultural implement [50].

As shown in FIGS. 1, 5, and 6 the hydraulic pump system has extended hydraulic hoses [20] which extend from the auxiliary hydraulic remote ports [61] of the tractor's hydraulic power block [23] to the ports [62] of the hydraulic pump [17]. Connection couplers [21] such as snap connectors or quick connectors may be used to connect the first ends [22] of said hydraulic hoses [20] to the auxiliary hydraulic remote ports [61] of the hydraulic power block [23] of the tractor. Connection couplers [21] may also be used to connect the second ends [24] of the hydraulic hoses to the ports [62] of the hydraulic pump [17]. The hydraulic hoses may be further secured to the first agricultural implement [40] and coupling device [100] to prevent entanglement during powered operation by means well known to one of ordinary skill in the art. The hydraulic pump [17] once connected to the tractor's hydraulic power block [23], powers the second agricultural implement.

A substantive encapsulation of the invention has been provided using specific terms and drawings. Such illustrations are for representative purposes only and are not intended to capture all iterations and variations of the invention.

The invention claimed is:

1. A coupling device to connect and separate first and second agricultural implements for towing behind a tractor and to provide hydraulic power to the second agricultural implement for tandem-powered operation, such coupling device comprising:
    a frame having at least one frame member and a separation distance;
    first connection means for attaching a front of the frame to a rear of said first agricultural implement;
    second connection means for attaching a rear of the frame to a front of said second agricultural implement and;
    a hydraulic pump system further comprising a hydraulic pump having a PTO shaft, fastening means for securing said hydraulic pump for engagement with said second agricultural implement, a pair of hydraulic hoses having first and second ends with connection couplers for attachment of said first ends to said tractor's hydraulic power block and said second ends to said hydraulic pump.

2. The coupling device of the claim 1 wherein said frame has a pair of curved frame members, an upper box member, vertical box members, horizontal box members, and a rear box member.

3. The coupling device of claim 1 wherein said frame has a single frame member having a plurality of shapes.

4. The coupling device of claim 1 wherein said frame has a plurality of frame members having a plurality of shapes.

5. The coupling device of claim 1 wherein the first connection means is a pair of clevis fastener and spindle assemblies attached to outer rear wheel spindles of said first agricultural implement wherein first ends of curved frame members are secured by hitch pins to said clevis fastener and spindle assemblies.

6. The coupling device of claim 1 wherein the second connection means is a draw bar and hitch pin.

7. The coupling device of claim 1 wherein the fastening means for securing said hydraulic pump is a pump frame secured to the front of the second agricultural implement.

8. The coupling device of claim 1 wherein the fastening means for securing said hydraulic pump is a pump frame.

9. The coupling device of claim 1 wherein the connection couplers are hydraulic quick connectors.

10. A coupling device to connect and separate first and second agricultural implements for towing behind a tractor and to provide hydraulic power to the second agricultural implement for the tandem-powered operation of both implements, such coupling device comprising:
    a frame having at least one frame member and a separation distance;
    first connection means for attaching a front of the frame to a rear of said first agricultural implement;
    second connection means for attaching the rear of a frame to the front of the second agricultural implement;
    a hydraulic pump system further comprising a hydraulic pump having a PTO shaft, fastening means for securing said hydraulic pump for engagement with said second agricultural implement, a pair of hydraulic hoses having first and second ends with connection couplers for attachment of said first ends to said tractor's hydraulic power block and said second ends to said hydraulic pump; and
    at least one dolly wheel and spindle assembly adjacent to said frame.

11. The coupling device of claim 10 wherein said frame has a pair of curved frame members, an upper box member, vertical box members, horizontal box members, and a rear box member.

12. The coupling device of claim 10 wherein said frame has a single frame member having a plurality of shapes.

13. The coupling device of claim 10 wherein said frame has a plurality of frame members having a plurality of shapes.

14. The coupling device of claim 10 wherein the first connection means is a pair of clevis fastener and spindle assemblies attached to outer rear wheel spindles of said first agricultural implement wherein first ends of curved frame members are secured by hitch pins to said clevis fastener and spindle assemblies.

15. The coupling device of claim 10 wherein the second connection means is a draw bar and hitch pin.

16. The coupling device of claim 10 wherein the fastening means for securing said hydraulic pump is a pump frame secured to the front of the second agricultural implement.

17. The coupling device of claim 10 wherein the fastening means for securing said hydraulic pump is a pump frame.

18. The coupling device of claim 10 wherein the connection couplers are hydraulic quick connectors.

19. The dolly wheel and spindle assembly of claim 10 wherein the dolly wheel and spindle assembly may swivel 360 degrees.

* * * * *